(No Model.) 3 Sheets—Sheet 2.

R. LUNDELL.
ELECTRIC MOTOR OR DYNAMO ELECTRIC MACHINE.

No. 583,264. Patented May 25, 1897.

WITNESSES:
C. E. Ashley
M. M. Robinson

INVENTOR:
Robert Lundell
By his Attorney
Charles J. Kintner (No Model.) 3 Sheets—Sheet 3.

R. LUNDELL.
ELECTRIC MOTOR OR DYNAMO ELECTRIC MACHINE.

No. 583,264. Patented May 25, 1897.

WITNESSES:
C. E. Ashley
M. M. Robinson

INVENTOR:
Robert Lundell
By his Attorney
Charles J. Kintner

UNITED STATES PATENT OFFICE.

ROBERT LUNDELL, OF BROOKLYN, NEW YORK, ASSIGNOR OF TWO-THIRDS TO THE INTERIOR CONDUIT AND INSULATION COMPANY, OF NEW YORK, N. Y.

ELECTRIC MOTOR OR DYNAMO-ELECTRIC MACHINE.

SPECIFICATION forming part of Letters Patent No. 583,264, dated May 25, 1897.

Application filed December 15, 1896. Serial No. 615,737. (No model.)

*To all whom it may concern:*

Be it known that I, ROBERT LUNDELL, a citizen of the United States, residing at Brooklyn, in the county of Kings and State of New York, have made a new and useful invention in Electric Motors or Dynamo-Electric Machines, of which the following is a specification.

My invention is directed particularly to improvements upon an electric motor disclosed in a prior patent granted to me by the United States Patent Office on the 24th day of January, 1893, and numbered 490,449; and its object is to simplify the structure disclosed in the aforesaid patent by making the field-magnet of fewer parts and so arranging the entire structure that the motor is made more compact in form and that an increased efficiency is obtained with a minimum amount of material. In the motor disclosed in the aforesaid patent a single field-magnet coil incloses or surrounds inwardly-projecting field-magnet poles and a rotary armature, the axes of the field-magnet and the armature being coincident. The outer ends of the field-magnet poles are secured to the heads or ends of a cylinder or drum, the arrangement being such that it is in effect an ironclad motor.

My present invention is an improvement upon the structure disclosed in the aforesaid patent to the extent that I construct the field-magnet cores of two castings which are precisely alike, except that the supporting-feet, which are cast integral therewith, are placed in different positions relatively, and these two parts are of such conformation that the inwardly-projecting pole-pieces will always maintain a fixed or relative position to each other and to the exterior or surrounding shells of which they are integral parts, the interior contour of the pole-pieces and surrounding shells being such that with a minimum amount of magnetic material there is afforded a free path for all of the magnetic lines of force.

My invention contemplates also a novel form of field-magnet coil adapted to fit snugly within the interior space between the two magnetic shells and the inclosed inwardly-projecting pole-pieces.

The especial points of novelty of my invention are particularly pointed out in the claims at the end of this specification.

Figure 1:
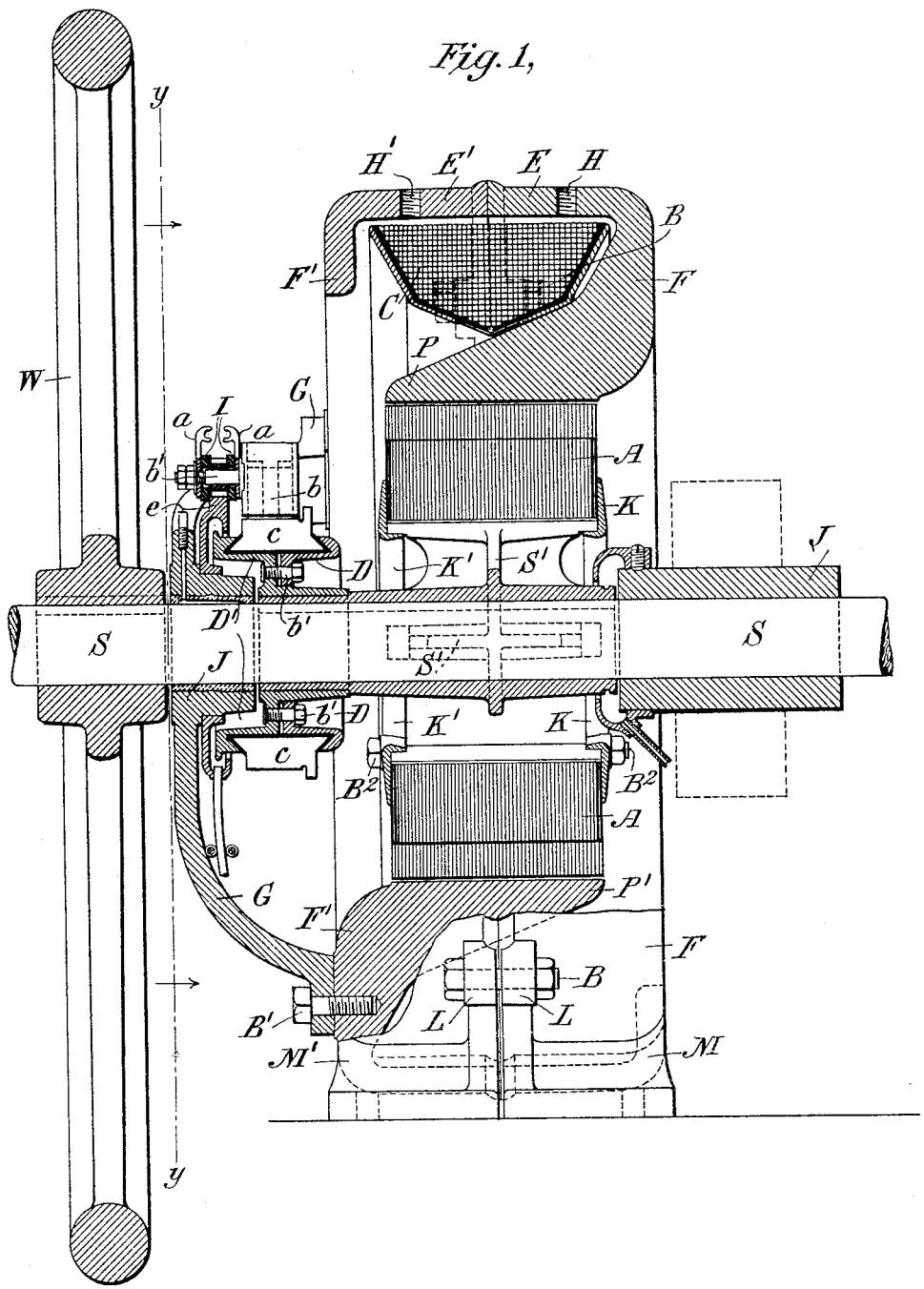
Figure 2:
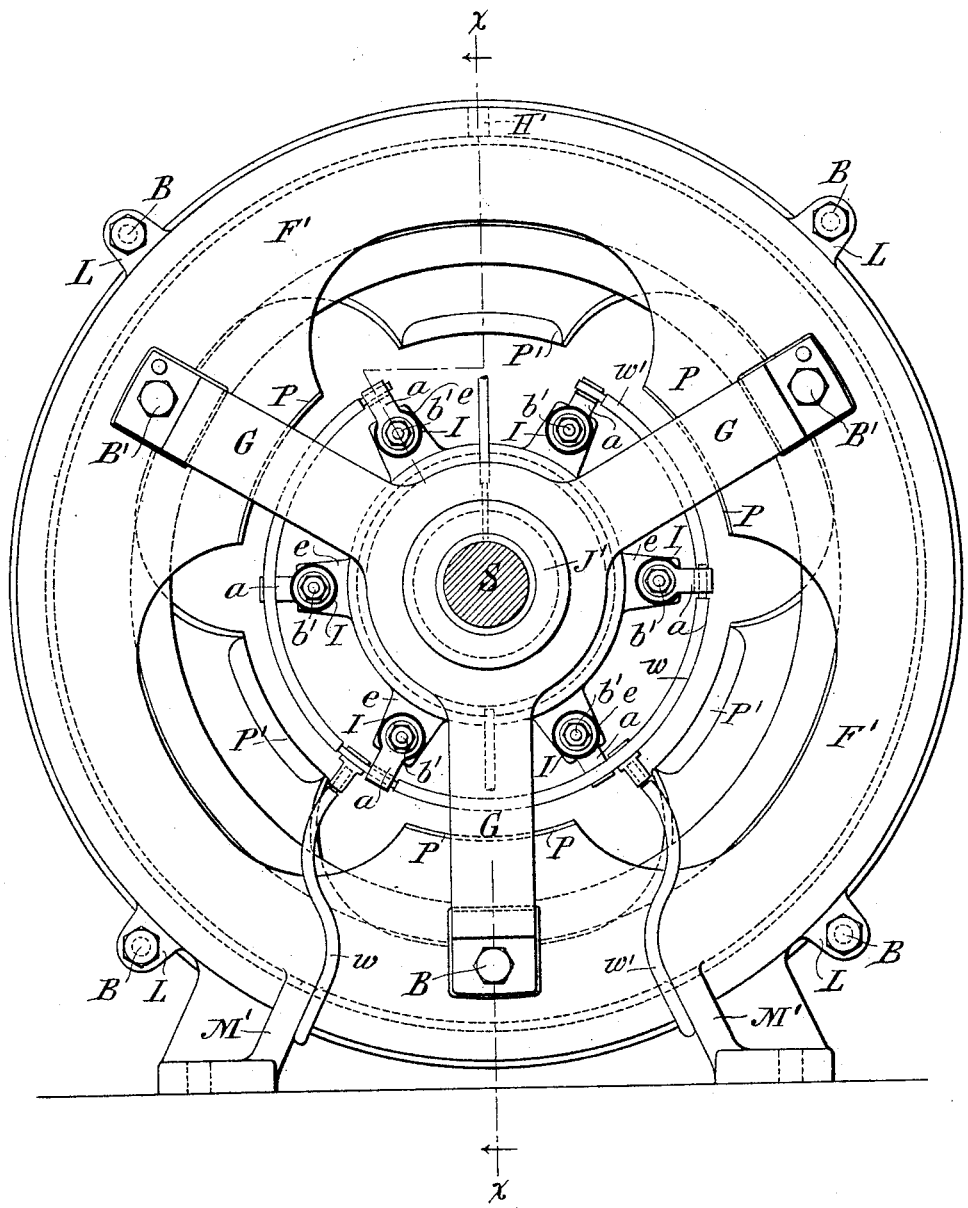
Figure 3:
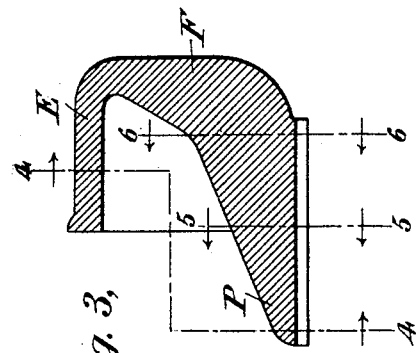
Figure 4:
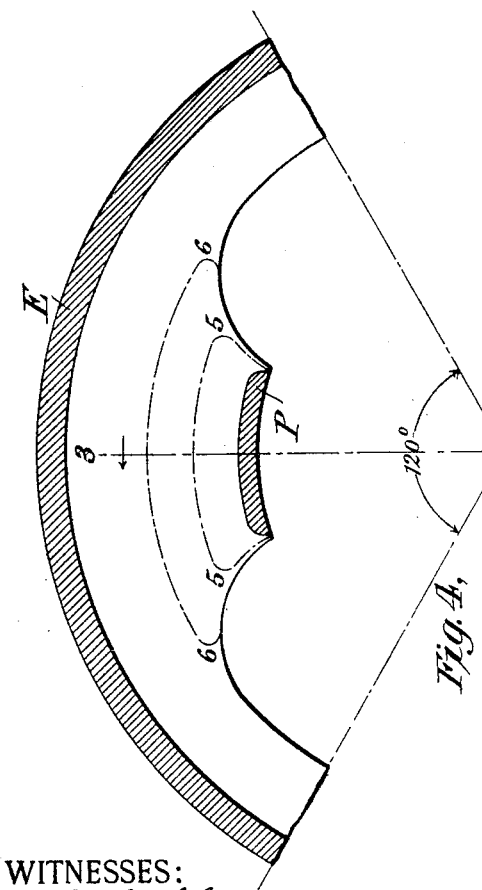
Figure 5:
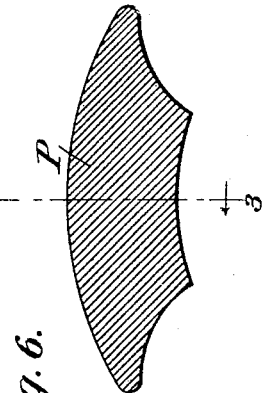
Figure 6:
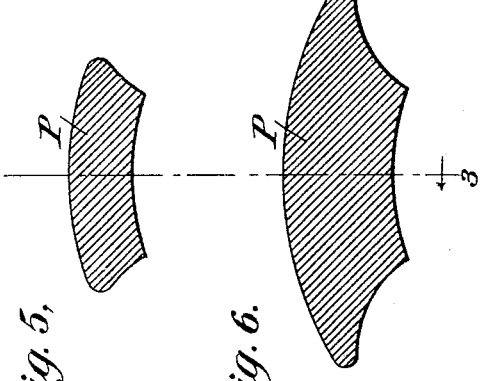

Referring now to the accompanying drawings, Figure 1 is a vertical longitudinal sectional view of the entire motor, taken on the broken line *x x*, Fig. 2, and as seen looking from the right toward the left in the direction of the arrows upon that figure. Fig. 2 is a sectional view taken on the line *y y*, Fig. 1, and as seen looking from the left toward the right upon that figure. Fig. 3 is a longitudinal sectional view of one side of one of the field-magnet cores, showing one of the poles and its integral surrounding shell. Fig. 4 is a sectional view of the same, taken on the broken line 4 4, Fig. 3, and as seen looking at that figure from the left toward the right in the direction of the arrows. Fig. 5 is a sectional view taken on the line 5 5, Fig. 3, and as seen looking from the right toward the left in the direction of the arrows upon that figure. Fig. 6 is a sectional view taken on the line 6 6, Fig. 3, and as seen looking from the right toward the left in the direction of the arrows upon that figure, the contour of these sectional views (shown in Figs. 5 and 6) being illustrated in broken curved lines by the lines 5 5 and 6 6, Fig. 4.

The motor herein shown and described is of multipolar form, there being six inwardly-projecting wedge-shaped field-magnet poles, three of which (lettered P P P) are cast integral with a side piece F, shell E, and feet or supports M, the centers of said pole-pieces being one hundred and twenty degrees apart, as will be apparent on inspection of Fig. 4 of the drawings. The other three inwardly-projecting wedge-shaped pole-pieces P′ P′ P′, located also one hundred and twenty degrees apart, are cast integral with the side piece F′, cylindrical shell E′, and feet or supports M′, and are so arranged that when the two parts are put together there is formed an inclosing cylindrical shell E E′, the halves of which are provided with lugs L L L L, held together by bolts B B B B, as indicated in Fig. 2 of the drawings.

H and H′ represent screw-threaded holes for securing eyebolts to the shells E E′

W represents a fly-wheel carried by an armature-shaft S, secured in a journal-bearing J, carried by a spider G, secured to the side pieces F by bolts B' B' B'.

A is the armature, secured to the armature-shaft by a spider S', K K' being end plates for securing the parts of the armature together through the agency of bolts $B^2$ $B^2$ $B^2$.

D D' represent the commutator-supports, consisting of two metallic castings secured together by bolts $b'$ $b'$ and sustaining in the usual manner the commutator-strips $c$ $c$ $c$, $b$ $b$ being the commutator-brushes, connected directly to insulated conductors $w$ $w'$, carried by radial arms $a$ $a$ $a$ $a$ $a$, secured to extensions $e$ $e$, &c., of the spider G by bolts $b'$ $b'$, &c., I I being insulating-sleeves for insulating the supporting-arms $a$ $a$, &c.

In the process of casting I so design the field-magnet cores F and F', pole-pieces P P', and their integral or inclosing shells E E' that the cross-sectional area of one hundred and twenty degrees of the surrounding shell and the pole-piece at the base or thickest part shall be of equal area. This is made apparent upon examination of Figs. 4 and 6, in which it will be remembered Fig. 6 is a sectional view taken on the line 6 6, Fig. 3, at the base of the pole-piece, the cross-sectional area of which is equal to the cross-sectional area of the part E, Fig. 4.

It will be apparent upon inspection of Figs. 3, 5, and 6 that the pole-piece P at its base where it joins the shell has an area of about twice the cross-section of the pole-piece at its central part (see Figs. 5 and 6) and that at the inner end it has simply cross-section enough to avoid unnecessary frailness of structure. It is therefore obvious that the pole-piece P at its base has sufficient cross-sectional area to carry all of the magnetic lines of force and that by reason of the fact that the shell E has a similar cross-sectional area it is capable of carrying the same lines. By thus proportioning the parts of the field-magnet poles P P', cores F F', and their surrounding integral shells E E', I am enabled to obtain the best possible results with a minimum amount of magnetic material. The nature of the structure is also such, by reason of the cylindrical forms of the shells E and E' and the poles P P', that the castings will not warp, and I obtain, therefore, field-cores with integral shells and pole-pieces which have always a fixed relation to each other and are adapted to be put together with a certainty that the parts will always maintain fixed lineal relations, thereby insuring at all times absolute coincidence of the axes of both the field-magnet and armature.

The field-magnet coil C is of five-sided form, as will be apparent on inspection of the cross-sectional view thereof shown in Fig. 1, this form being necessary to adapt it to the peculiar conformation of the wedge-shaped pole-pieces and the structure of the outer ends of the field-magnet core and the inclosing shells E E' when put together. It is apparent, therefore, that the form of the cores, pole-pieces, and coils is such as to give a machine which avoids any waste of space and renders the entire structure as compact as possible.

Having thus described my invention, what I claim, and desire to secure by Letters Patent of the United States, is—

1. An electric motor having a field-magnet consisting of two cylindrical inclosing magnetic shells having inwardly-projecting wedge-shaped pole-pieces and legs or supports cast integral therewith, in combination with a single five-sided field-magnet coil adapted to conform to the interior structure of said cylindrical parts when secured together, substantially as described.

2. An electric motor having a field-magnet composed of two duplicate cylindrical inclosing shells having wedge-shaped inwardly-projecting pole-pieces and beveled or inclined inner faces, together with legs or supports cast integral with said shells, in combination with a single five-sided field-magnet coil adapted to conform to the shape of the wedge-shaped pole-pieces and inclined inner faces of said field-magnet, said magnetic shells being secured together by bolts and lugs or ears, substantially as described.

3. An electric motor having a field-magnet composed of two duplicate cylindrical inclosing magnetic shells having inwardly-projecting wedge-shaped pole-pieces and legs or supports all cast integral, in combination with a single field-magnet coil which fills the entire space made by the united shells and the inwardly-projecting pole-pieces, substantially as described.

In testimony whereof I have hereunto subscribed my name this 10th day of December, 1896.

ROBERT LUNDELL.

Witnesses:
C. J. KINTNER,
M. M. ROBINSON.